United States Patent
Vehlies et al.

(10) Patent No.: US 12,448,077 B2
(45) Date of Patent: Oct. 21, 2025

(54) 3D LATTICE GRIPS

(71) Applicants: Gregory J. Vehlies, Katy, TX (US);
Joe Lowinske, Minneapolis, MN (US)

(72) Inventors: Gregory J. Vehlies, Katy, TX (US);
Joe Lowinske, Minneapolis, MN (US)

( * ) Notice: Subject to any disclaimer, the term of this patent is extended or adjusted under 35 U.S.C. 154(b) by 0 days.

(21) Appl. No.: 18/776,021

(22) Filed: Jul. 17, 2024

(65) Prior Publication Data
US 2025/0026433 A1    Jan. 23, 2025

Related U.S. Application Data

(60) Provisional application No. 63/514,112, filed on Jul. 17, 2023, provisional application No. 63/611,917, filed on Dec. 19, 2023.

(51) Int. Cl.
*B62K 21/26* (2006.01)
*B33Y 80/00* (2015.01)

(52) U.S. Cl.
CPC .............. *B62K 21/26* (2013.01); *B33Y 80/00* (2014.12)

(58) Field of Classification Search
CPC ..................................................... B62K 21/26
See application file for complete search history.

(56) References Cited

U.S. PATENT DOCUMENTS

| | | | | |
|---|---|---|---|---|
| 1,526,681 | A | * | 2/1925 | Round .................. B62M 25/04 74/489 |
| 5,280,735 | A | * | 1/1994 | Kuipers ................ B62K 21/26 74/551.8 |
| 10,888,754 | B2 | * | 1/2021 | Wells ..................... A63B 60/14 |

FOREIGN PATENT DOCUMENTS

DE    102011018163 A1 * 10/2012    ......... B62K 21/125

\* cited by examiner

*Primary Examiner* — Vicky A Johnson

(57) ABSTRACT

The present invention utilizes additive manufacturing in conjunction with 3D lattice patterns and shapes to achieve grips and wraps that embody enhanced grippiness, e.g. the ease in which a user may maintain a secure hold or contact of the handle or gripping surface of an object, enhanced impact absorption of the end-product, enhanced mitigation of impact transference to the user's body and appendages, and the capability to mitigate moisture collection under and around the user's grip on the grip or wrap via introducing increased airflow and surface area.

6 Claims, 9 Drawing Sheets

3D LATTICE GRIPS

CROSS-REFERENCE TO RELATED APPLICATIONS

This application claims priority to U.S. Provisional Application 63/514,112, filed on Jul. 17, 2023; U.S. Provisional Application 63/611,917, filed on Dec. 19, 2023; and U.S. Provisional Application 63/614,109, filed on Dec. 22, 2023.

STATEMENT REGARDING FEDERALLY SPONSORED RESEARCH

Not applicable.

BACKGROUND

Wrist and hand fatigue can be a common issue for bicyclists from using improperly sized or rigid hand grips on bicycle handlebars. The present invention offers various embodiments of 3D (three-dimensional) patterned grip wraps for ease of use and manufacturing in place of typical commercial foam, rubber, or textile grip replacement or enhancements. The present invention may use additive manufacturing to form and make the claimed 3D lattice grips and wraps. Such additive manufacturing should be construed to those of ordinary skill in the art as manufacturing by adding small amounts of material in one or more layers to form a 3D structure, such additive manufacturing may include 3D filament printing, 3D resin printing, stereolithography (SLA), selective laser sintering (SLS), fused deposition modeling (FDM), fused filament fabrication (FFF). It should be appreciated that the present invention can have far broader applications beyond bicycle handlebars to any device or equipment that includes a handle or requires gripping. Such applications can include a stand-alone 3D lattice grip wrap that a user may carry or keep around the house to assist with lifting bags, opening doors knobs, or other items and activities that the user may not otherwise be able to perform efficiently or without causing bodily harm or injury. The 3D lattice grips and wraps described and claimed herein can allow arthritic users to have a better grip on an object that may otherwise be too painful or uncomfortable to the user without said 3D lattice grip or wrap.

Current grip and wrap manufacturing processes yield products which are inefficient in reducing impact and stress forces. Typical manufacturing processes, as known in the art, inhibit impact reduction due to relying solely on the physical properties of the material used in the grip or wrap, e.g. hardness, rate of rebound, and/or tactile sensation. Additionally, typical manufacturing processes inhibit impact reduction due to the lack of physical integration between constituent components of the handle and wraps, where additive manufacturing processes and integrate components, shapes, and/or materials not otherwise available through typical manufacturing processes. Additionally, non-additive manufacturing process does not permit open object designs, in the context of grip designs, this means that hand moisture cannot be effectively mitigated, or the moisture may not be effectively removed away from the user's hand grip. Such inefficiencies are partially due to material selection and lack of airflow within, between, and around the grip, wrap, or user's hand.

The present invention utilizes additive manufacturing in conjunction with 3D lattice patterns and shapes to achieve grips and wraps that embody enhanced grippiness, e.g. the ease in which a user may maintain a secure hold or contact of the handle or gripping surface of an object, enhanced impact absorption of the end-product, enhanced mitigation of impact transference to the user's body and appendages, and the capability to mitigate moisture collection under and around the user's grip on the grip or wrap via introducing increased airflow and surface area. Other benefits of the described additive manufacturing process for the hand grips and grip wraps are that of the novel lattice pattern and allowance for end-part customization, sizing, personal preferences, colors, materials, and flexibility.

Other benefits of the present invention include improved flexibility of materials and/or structure, torsion of grip material to provide superior experience through reduction of blister, fatigue, overexertion of muscle, and joint soreness opportunities. Still other benefits of the present invention include allowing for the user's grip or hand to slide/glide over the handlebar material, which transfers some of the forces and vibrations exerted upon the bike into the user at a greatly reduced rate versus conventional handlebar materials and designs.

There is a long felt need for improvements to conventional handlebar grip designs, structures, and materials. The present invention and the described methods of manufacture achieve and satisfy this long felt need by providing improved shock absorption, reduced fatigue/soreness, and customizability/personalization of the handlebar grip and/or wraps.

SUMMARY

The present invention and methods of manufacturing are produced through additive manufacturing methods, as further described herein. The additive manufacturing processes offer the ability to produce various complex lattices that offer improved impact protection and/or resistance, while also offering improved comfort, user experience, and control over variables of the manufacturing process, including, but not limited to, modulating the thickness of layers, structural supports, lattice patterns, thickness of individual lattice struts.

Some embodiments may include handlebar grip comprising a three-dimensional lattice structure forming a hollow cylinder having an internal surface; an internal sleeve having an exterior surface, wherein said three-dimensional lattice structure is affixed to the exterior surface of said internal sleeve. Other embodiments may further include one or more securing rings disposed at one or more of a terminal end of said internal sleeve. Other embodiments may further include one or more protrusions extending from the one or more terminal ends of said internal sleeve. Still other embodiments may further comprise three-dimensional lattice structure having a surface and is formed by an additive manufacturing process wherein said three-dimensional lattice structure further comprises a mesh layer, defined curve portions and added volume of material forming a raised textured surface on the surface of the said three-dimensional lattice structure.

Other embodiments may include a handlebar grip comprising a plurality of three-dimensional lattice structures forming a plurality of hollow cylinders each having an internal surface; a plurality internal sleeves each having an exterior surface, wherein said each of the plurality of three-dimensional lattice structures is affixed to the exterior surface of said plurality of internal sleeves; wherein each of the plurality of internal sleeves comprises a mating end wherein said mating ends are capable of a secure mating engagement. Some embodiments may include mating ends further comprises one or more alignment tabs and corresponding hollow for receiving the alignment tab on other of said mating ends.

Other embodiments may include a handlebar grip comprising a three-dimensional lattice structure comprising one or more layers of three-dimensional lattice; an internal sleeve having an exterior surface, wherein a three-dimensional ridge structure is disposed upon said exterior surface of the internal sleeve; wherein said three-dimensional lattice structure further comprises an interior surface that slidably engages with the exterior surface of said internal sleeve. Some embodiments may further include a securing fastener disposed a terminal end of said internal sleeve preventing the disengagement of the three-dimensional lattice structure from the internal sleeve. Other embodiments may include a securing fastener is a securing ring. Other embodiments including a three-dimensional lattice structure may comprise a plurality of nested layers of three-dimensional lattice structures. Other embodiments may include a three-dimensional lattice structure further comprising a keyway for engagement with a three-dimensional ridge structured disposed on an internal sleeve.

DETAILED DESCRIPTION

Figure 1A:
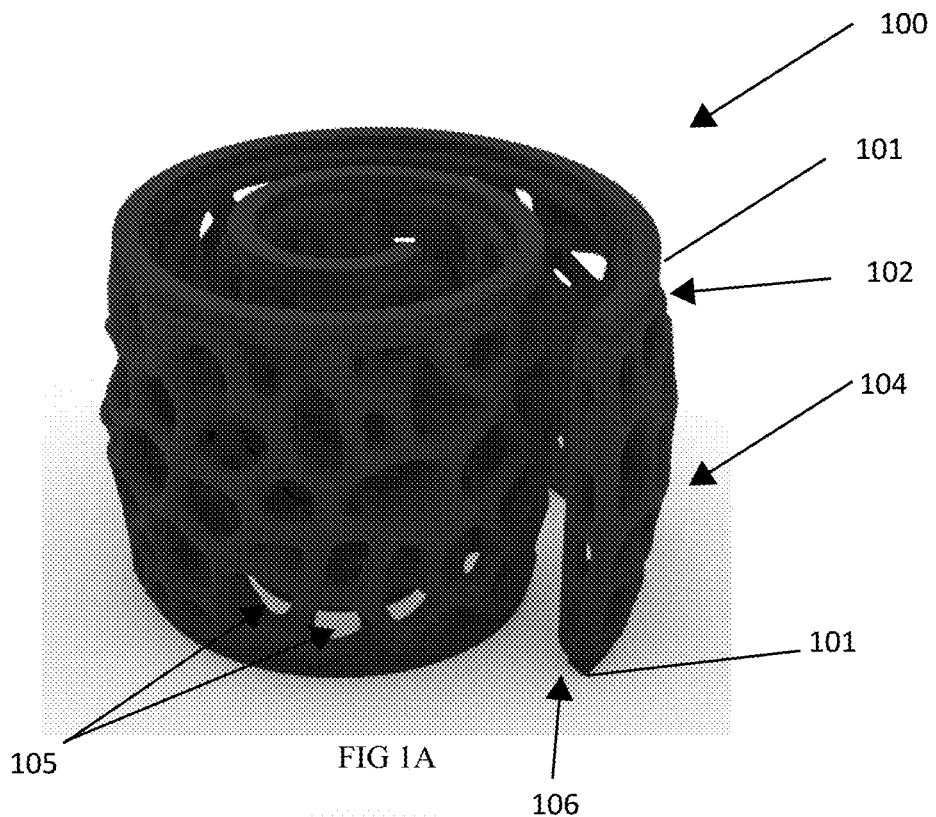
FIG. 1A is an isometric side view of an embodiment of grip wrap material bearing the lattice structure.

One or more illustrative embodiments incorporating the invention disclosed herein are presented below. The inventor has created a revolutionary and novel handlebar grip and grip wrap with the goal to improve impact protection and/or resistance, while also offering improved comfort, user experience, and control over variables of the manufacturing process, including, but not limited to, modulating the thickness of layers, structural supports, lattice patterns, thickness of individual lattice struts. The present invention utilizes additive manufacturing in conjunction with 3D lattice patterns and shapes to achieve grips and wraps that embody enhanced grippiness, e.g. the ease in which a user may maintain a secure hold or contact of the handle or gripping surface of an object, enhanced impact absorption of the end-product, enhanced mitigation of impact transference to the user's body and appendages, and the capability to mitigate moisture collection under and around the user's grip on the grip or wrap via introducing increased airflow and surface area. Other benefits of the described additive manufacturing process for the hand grips and grip wraps are that of the novel lattice pattern and allowance for end-part customization, sizing, personal preferences, colors, materials, and flexibility.

It should be appreciated that the present invention can have far broader applications beyond bicycle handlebars to any device or equipment that includes a handle or requires gripping. Such applications can include a stand-alone 3D lattice grip wrap that a user may carry or keep around the house to assist with lifting bags, opening doors knobs, or other items and activities that the user may not otherwise be able to perform efficiently or without causing bodily harm or injury. The 3D lattice grips and wraps described and claimed herein can allow arthritic users to have a better grip on an object that may otherwise be too painful or uncomfortable to the user without said 3D lattice grip or wrap.

In the following description, certain details are set forth such as specific quantities, sizes, etc. to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing embodiments of the disclosure and are not intended to be limiting thereto. Drawings are not necessarily to scale, and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless, or essentially meaningless, the definition should be taken from Webster's Dictionary 2023. Definitions and/or interpretations should not be incorporated from other patent applications, patents, or publications, related or not, unless specifically stated in this specification, or if the incorporation is necessary for maintaining validity.

While preferred embodiments have been shown, and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied.

Figure 1B:
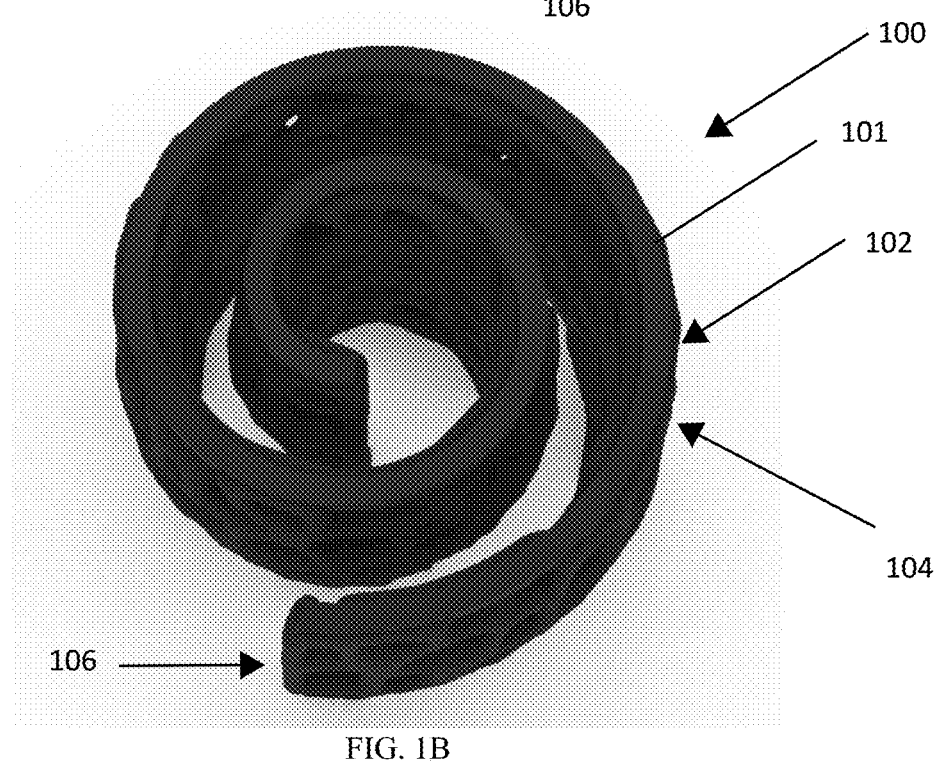
FIG. 1B is an isometric top view of an embodiment of grip wrap material bearing the lattice structure.

FIG. 1A depicts an embodiment of the present invention demonstrating the malleability of and flexibility of the 3D lattice grip and accompanying structure. It should be appreciated that some embodiments of the 3D lattice grip 100 may include one or more side edges 101 comprising a side rail 102. The 3D lattice grip can further include a three-dimensional webbed structure 104 wherein cavities 105 may be interspersed between portions of the lattice and through the thickness 106. Such cavities are possible through the additive manufacturing process used in the manufacturing processes of the 3D lattice grip. FIG. 1B depicts the same embodiment from a different view demonstrating a thickness 106 of the 3D lattice grip 100 and the one or more side edges 101.

Figure 2:
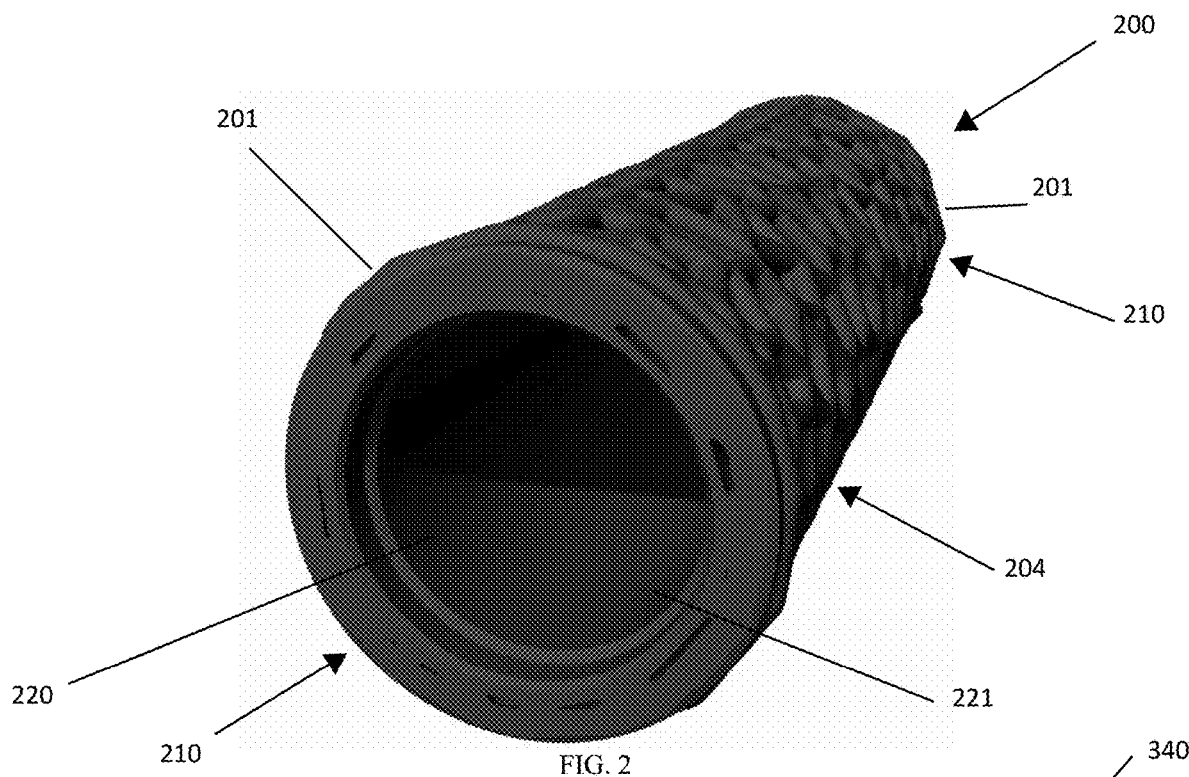
FIG. 2 is an isometric side view of a handlebar grip bearing the lattice structure.

FIG. 2 depicts an embodiment of the present invention of a 3D lattice grip 200 manufactured for a handlebar, such as a bicycle handlebar. The 3D lattice grip 200 may include one or more side edges 201 forming the terminal ends 210 of the hollow cylindrical tube formed by the 3D lattice grip. The 3D lattice grip may be formed as a single piece through use of an additive manufacturing process, which would otherwise be impossible to efficiently manufacturing through typical processes. It should be appreciated that in the embodiment shown in FIG. 2, the interior 220 of the hollow cylinder includes a solid inner wall 221 wherein the 3D lattice structure 204 is built on top or in situ with the solid inner wall 221 through the additive manufacturing process. It should be appreciated that some embodiments of the 3D lattice grip 200 may be affixed to a surface through a friction fit. Use of different manufacturing materials can achieve different levels of "stickiness" and an additional benefit of the additive manufacturing process allows for different compositions of materials through the manufacturing process to provide different material compositions to different areas of the 3D lattice grip 200.

Figure 3:
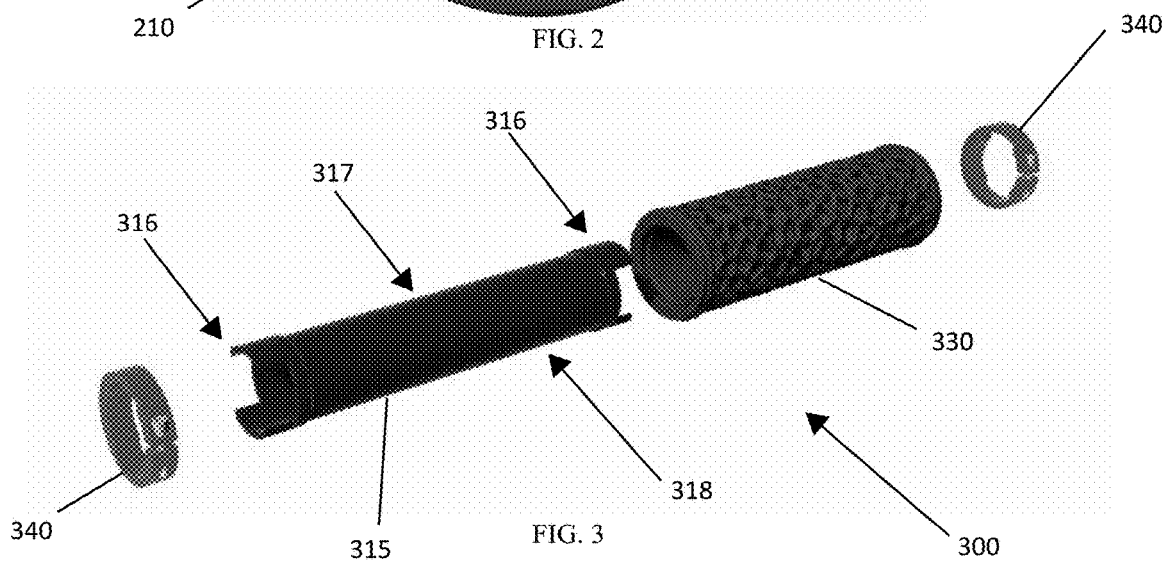
FIG. 3 is an exploded view of an embodiment handlebar grip, an overlay lattice structure wrap, and one or more securing rings.

FIG. 3 depicts an embodiment of the present invention of a 3D lattice grip 300 manufactured for a handlebar, such as a bicycle handlebar. Some embodiments may include an internal tube or sleeve 315 over which a 3D lattice structure 330 may be placed, installed, or formed. This process may include rolling a 3D lattice structure around the internal tube, slipping or sliding a 3D lattice structure 330 forming a cylindrical shape having a larger inner diameter than the outer diameter of the internal tube, and/or using additive manufacturing processes to build a 3D lattice grip on to the outer surface of the internal tube. It should be appreciated that some embodiments may include an internal tube 315 that is shorter than or equal in length to the 3D lattice grip and other embodiments may include an internal tube 315 that is longer than the length of the 3D lattice grip. In some embodiments where the internal tube 315 is longer in length than the 3D lattice grip, the embodiment may include securing rings or fasteners 340 to secure the 3D lattice structure 330 in place on the internal tube 315 wherein the securing rings or fasteners 340 secure to a portion 316 of the internal tube to secure the 3D lattice grip in a position along a length 317 of the internal tube's outer surface 318. Other embodiments may include securing rings or fasteners 340 that overlap and maintain contact with a portion of the 3D lattice structure 330 and an outer surface 318 of the internal tube. Other embodiments may include securing rings or fasteners 340 that overlap and maintain contact with the 3D lattice grip while the 3D lattice grip is joined to the outer surface of the internal tube. It should be appreciated that the securing rings or fasteners 340 may include friction fit rings, screw clamps, hose clamps, clip-on rings, snap-fit rings, one-piece bands, thermal constrictive tubing, press fit fasteners, rivets, screws, nuts & bolts, and other fastener and securing rings known in the art.

Figure 4A:
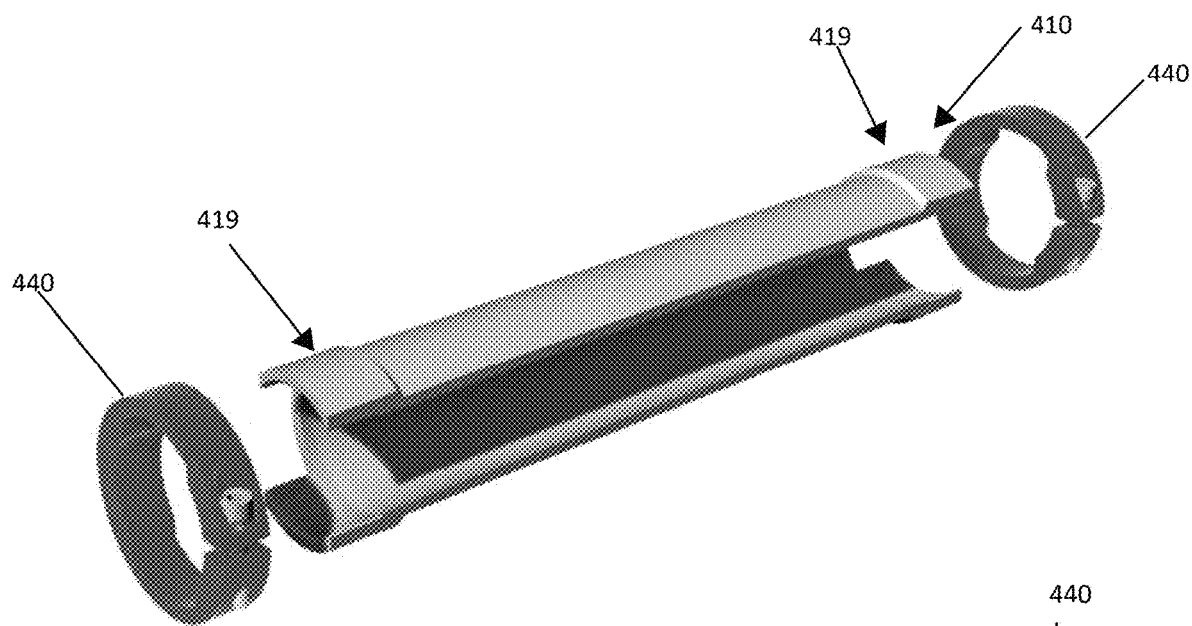
FIG. 4A is an exploded view of an embodiment handlebar with one or more securing rings.
Figure 4B:
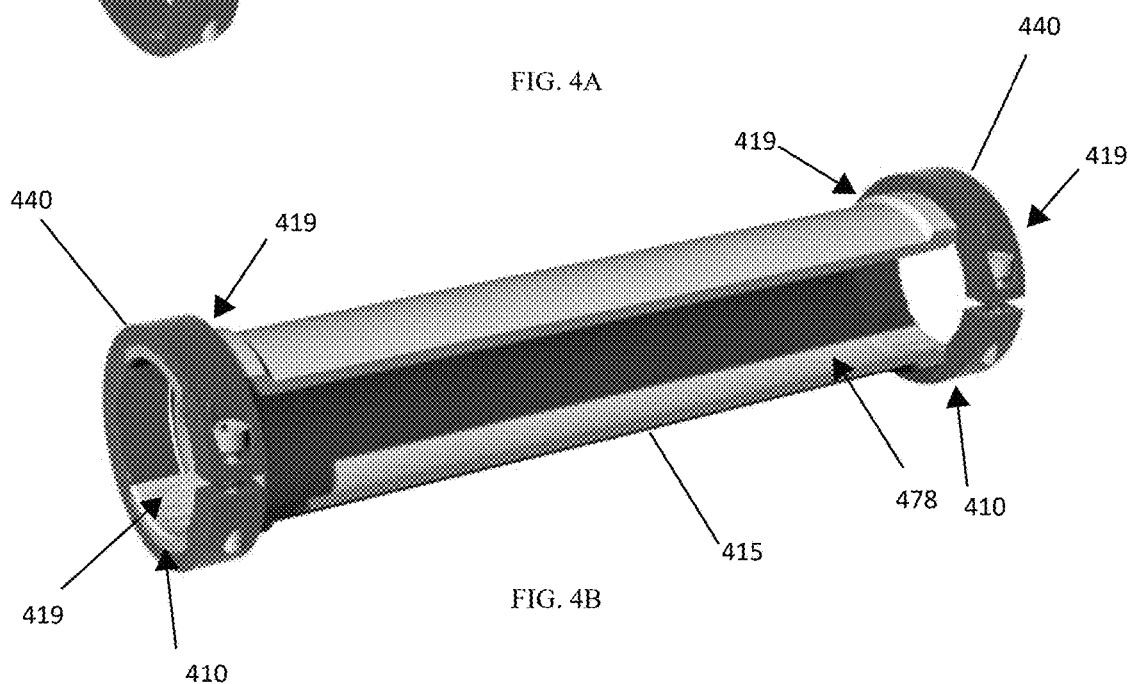
FIG. 4B is an isometric view of an embodiment handlebar wherein the one or more securing rings are affixed to a receiving end of the handlebar.

FIG. 4A and FIG. 4B demonstrate an embodiment of the present invention wherein the securing rings or fasteners 440 are shown in combination with an embodiment of the internal tube 415 having an exterior portion 478 cut-away for demonstrative purposes. FIG. 4A depicts the securing rings 440 detached from the internal tube 415 while FIG. 4B depicts the securing rings 440 installed at terminal ends 410 of the internal tube 415. It should be appreciated that some embodiments of the internal tube 415 may include wings or other protrusions 419 at the terminal ends 410 of the internal tube. It should be appreciated that the modularity and additive manufacturing process may allow for customization of sizing, color, materials, form, and fit to a specific user's use case, means, needs, or personal preferences.

Figure 5A:
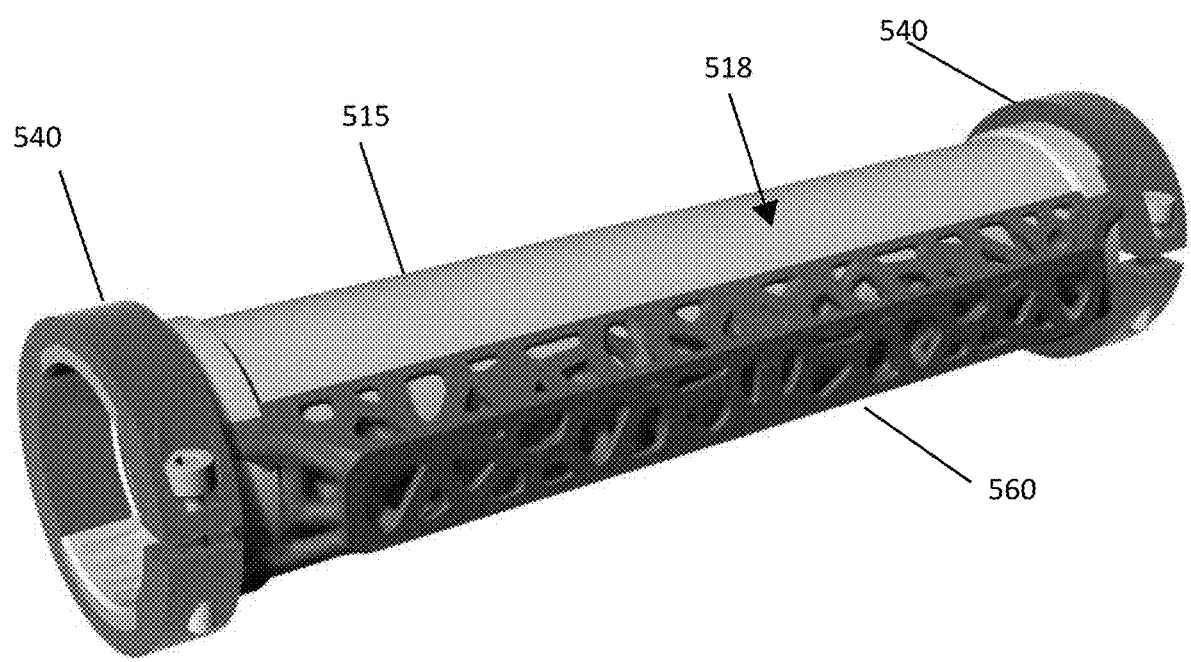
FIG. 5A depicts an isometric view of an embodiment handlebar including one or more securing rings and a lattice structure disposed along the body of the handlebar.
Figure 5B:
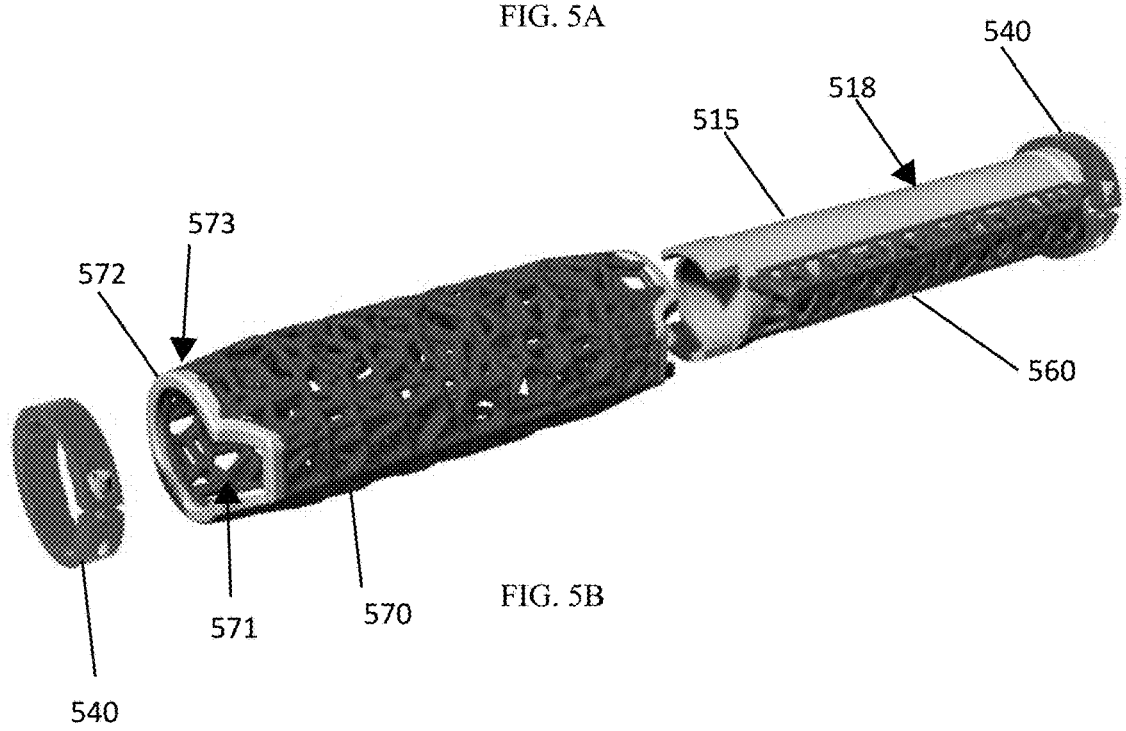
FIG. 5B depicts an isometric, exploded view of an embodiment handlebar including one or more securing rings and a lattice structure disposed along the body of the handlebar and a grip wrap lattice structure for insertion of the handlebar into a cavity formed by the grip wrap lattice structure.

FIG. 5A and FIG. 5B demonstrate an embodiment of the present invention wherein the internal tube 515 has a 3D lattice structure or ridge 560 formed on a portion of the outer surface 518 of the internal tube. It should be appreciated that such 3D lattice structure or ridge 560 may vary in size and shape as is one of the many benefits of additive manufacturing processes. FIG. 5B depicts the embodiment of FIG. 5A further including an additional 3D lattice grip 570 including a sleeve keyway 571 for installation over the internal tube 515 and 3D lattice structure or ridge 560. It should be appreciated that some embodiments, such as FIG. 5B, may include a 3D lattice grip 570 having modified cylindrical shape or sleeve keyway, again another benefit of additive manufacturing processes, to include a hollow or keyway 571 for alignment with the 3D lattice structure or ridge 560 that is formed on or attached to the internal tube surface 515. The 3D lattice grip 570 may also include edges 572 that may abut the securing rings or fasteners 540. It should be appreciated that the 3D lattice grip 570 may further have indentations 573 built into the 3D lattice for additional alignment or placement of one or more securing rings or fasteners.

Figure 6A:
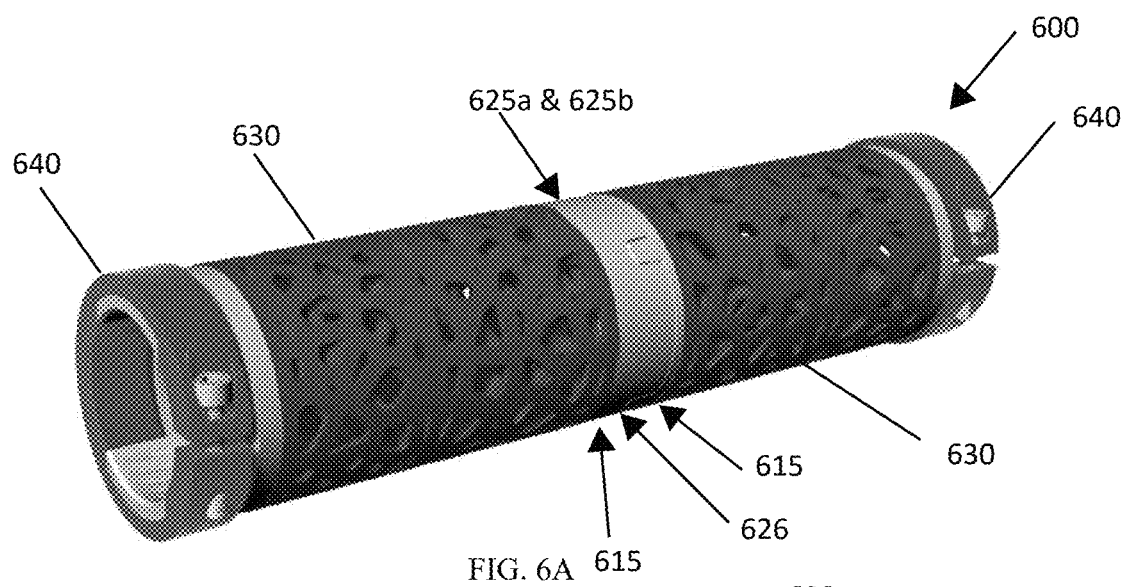
FIG. 6A depicts an isometric view of an embodiment of a multiple-section handlebar with the sections removably joined via a mating connection joint.
Figure 6B:
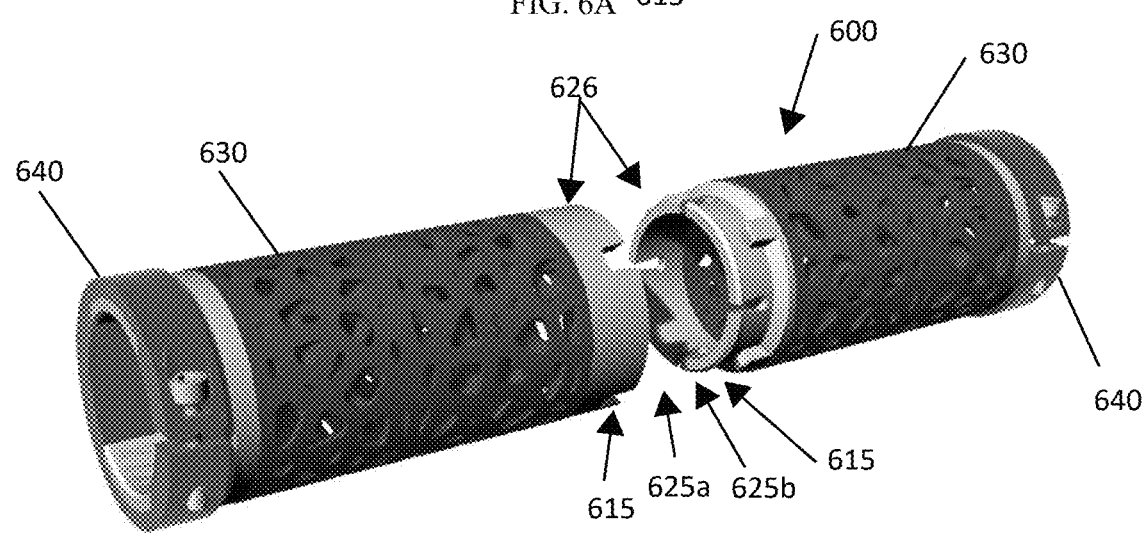
FIG. 6B depicts an isometric view of an embodiment of a multiple-section handlebar with the sections removably joinable via a mating connection joint.
Figure 6C:
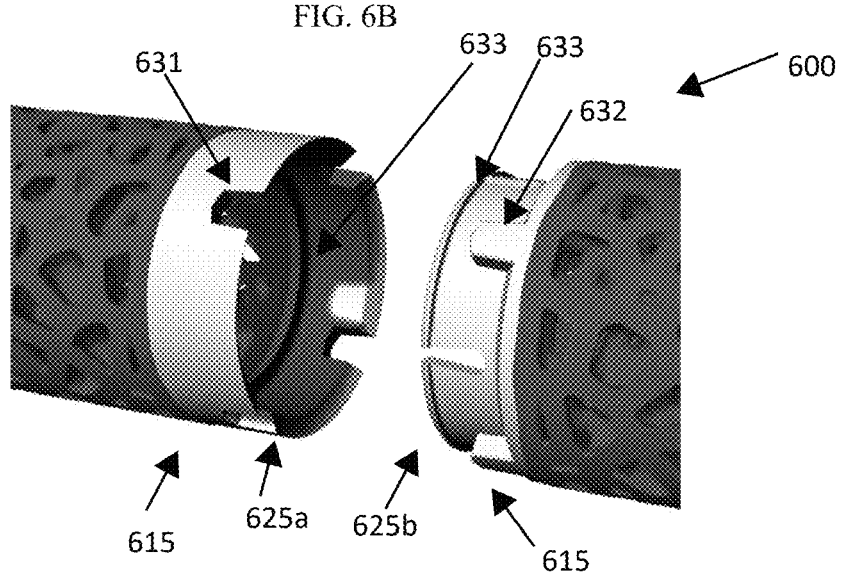
FIG. 6C depicts a close-up view of an embodiment of a multiple-section handlebar with the sections removably joinable via a mating connection joint.

FIGS. 6A, 6B, and 6C depict an alternative embodiment of the present invention wherein the handlebar device 600 includes a plurality of internal tubes 615 having one or more connecting joints 625a and 625b, a plurality of 3D lattice grips 630, and one or more securing rings or fasteners 640. FIG. 6B depicts an embodiment wherein the handlebar device 600 is disconnected via a mating engagement 626 between adjoining portions of the internal tube mating ends 625a and 625b providing an interlocking snap. It should be appreciated that this embodiment may be extrapolated in different permutations to provide multiple connectivity and provide modularity between grips and use cases. FIG. 6C demonstrates the alignment tabs 632 and hollows 631 between the two mating ends 625a and 625b and the press fit indentions 633 allowing for secure mating and engagement of the two ends 625a and 625b and otherwise preventing inadvertent disengagement of the two mating ends. It should be appreciated that the form of mating engagement can be varied in size and shape. It should be appreciated that some embodiments may include an additional securing ring or fastener to provide additional security and further preventing inadvertent disengagement of the two mating ends. It should be appreciated that the mating ends could be manufactured as part of the 3D lattice grip or the internal tube. It should be appreciated that some embodiments may include a unitary internal tube and 3D lattice grip while other embodiments may comprise a 3D lattice grip with mating ends and no internal tube.

Figures 7A, 7B:
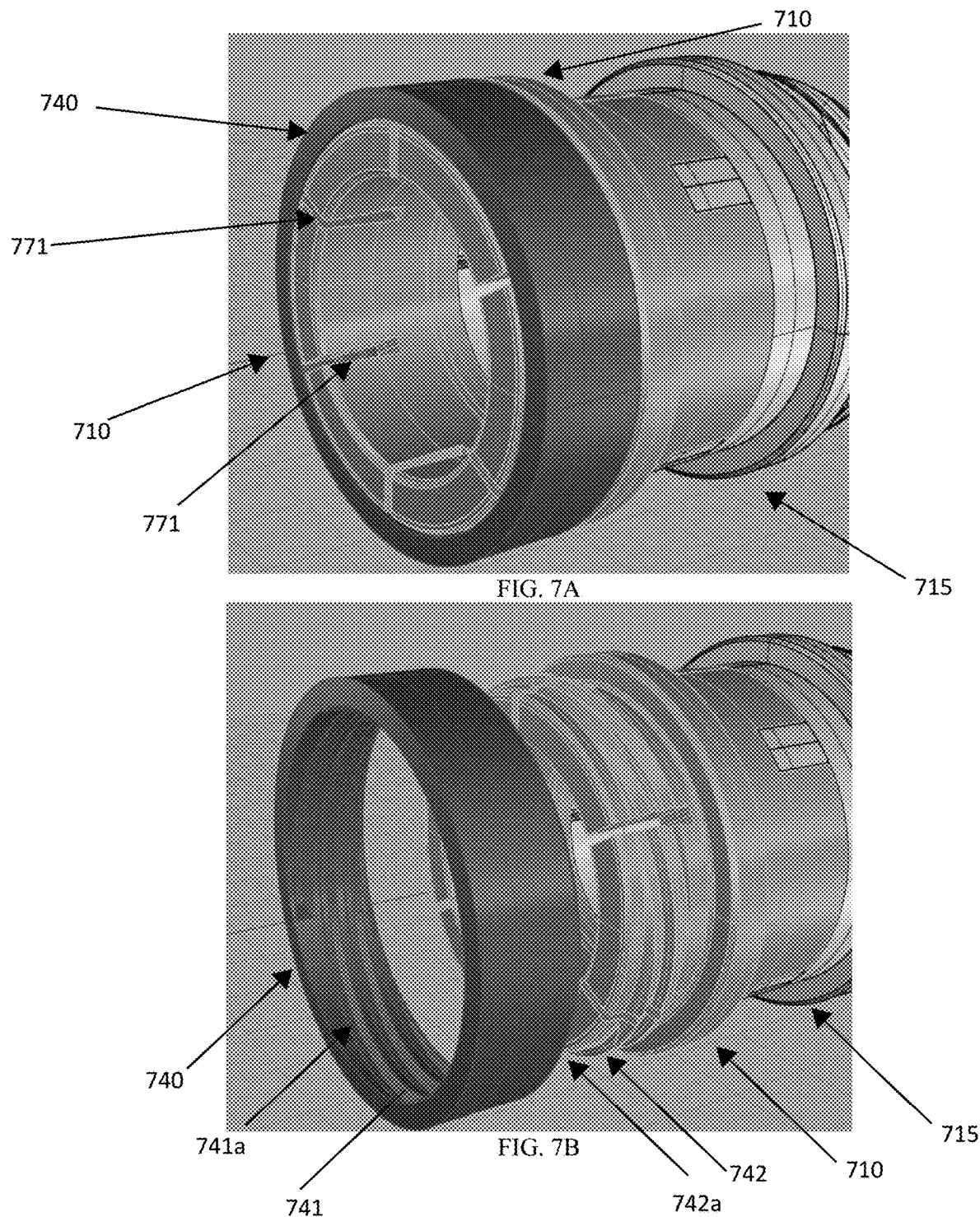
FIG. 7A depicts a close-up view of an alternative embodiment of a handlebar including a screw securing ring.
FIG. 7B depicts a close-up view of an alternative embodiment shown 7A wherein the screw securing ring is shown removed from the mating receiving end of the handlebar.

FIG. 7A and FIG. 7B depict an alternative embodiment of terminal end 710 and securing ring 740. The alternative embodiment depicted in FIGS. 7A and 7B includes a securing ring 740 having one or more threads 741 formed on an internal surface 741a and one or more mating threads 742 formed on an exterior surface 742a of a terminal end 710 of the internal tube and/or 3D lattice grip thus providing a threaded tension lock. Further shown are relief hollows 771 that allow for compression and expansion of the internal tube and/or 3D lattice grip body.

Figure 8A:
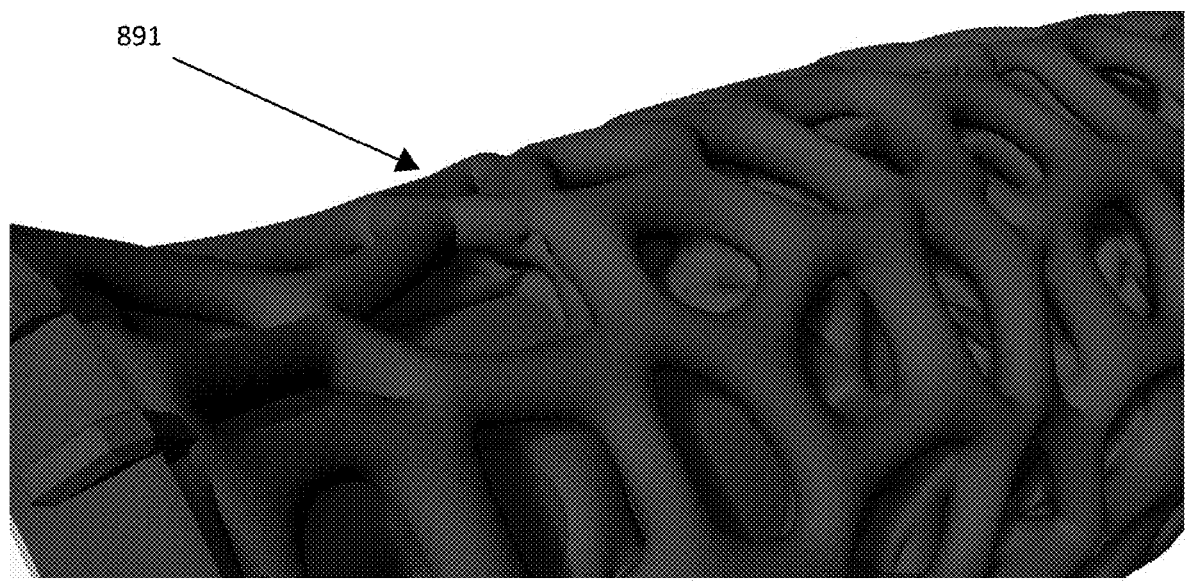
FIG. 8A depicts a close-up view of an alternative embodiment of the base lattice structure of the present invention.
Figure 8B:
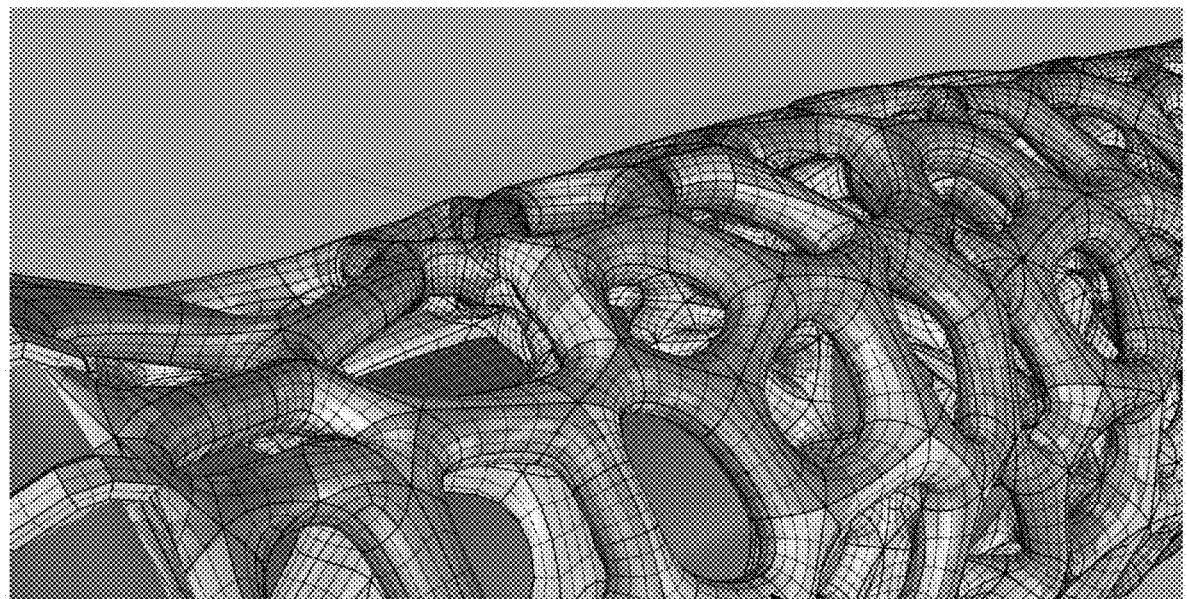
FIG. 8B depicts a close-up view the base lattice structure of FIG. 8A in a mesh form.
Figure 8C:
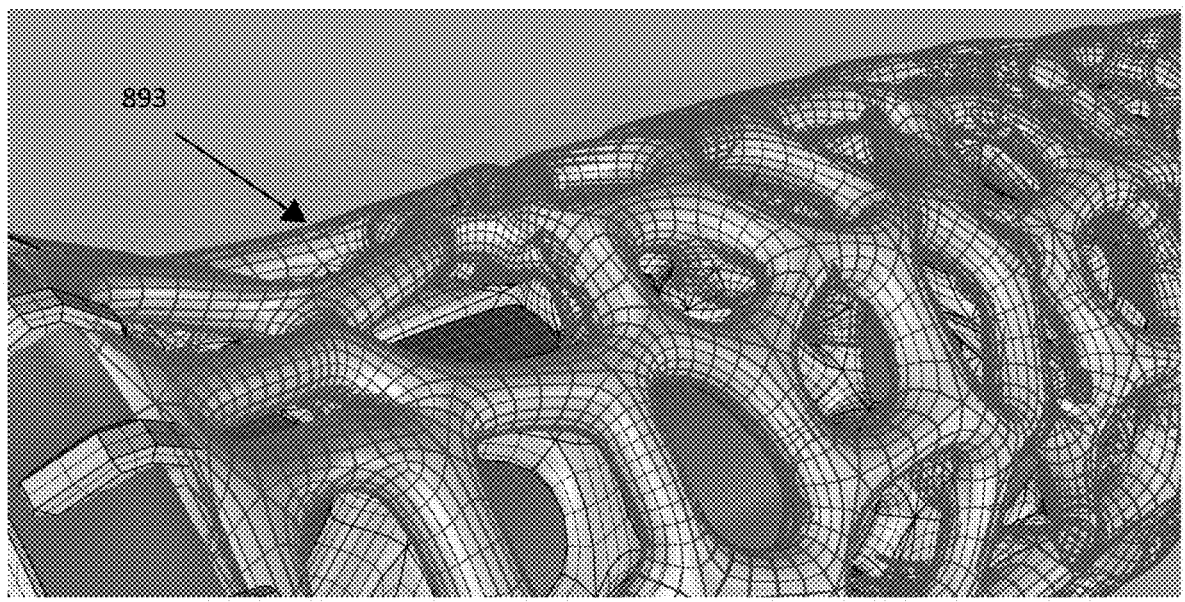
FIG. 8C depicts a close-up view of the base lattice structure in mesh form of FIG. 8B further divided into curve quadrants.
Figure 8D:
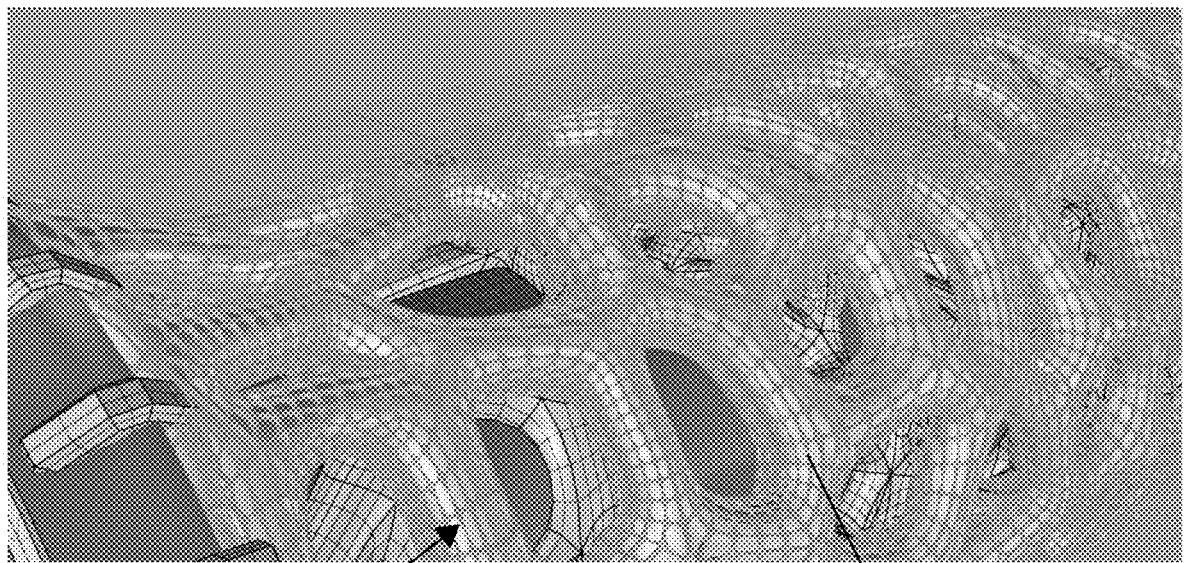
FIG. 8D depicts a close-up view of the base lattice structure in mesh form and divided into curve quadrants of FIG. 8C with the addition of added volume to the curves to a desired depth for texturing.
Figure 8E:
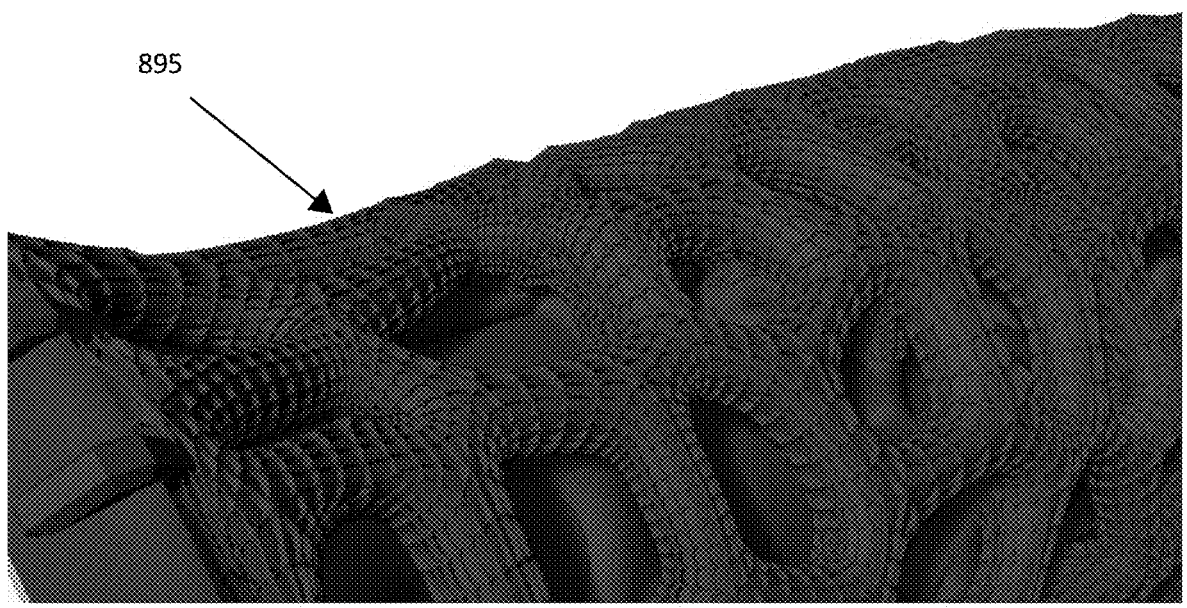
FIG. 8E depicts a close-up view of the base lattice structure in mesh form and divided into curve quadrants with the additional volume to provide a desired depth for texturing of FIG. 8D wherein the surface texture is exported to the base lattice surface for additive manufacturing.

FIGS. 8A, 8B, 8C, 8D, and 8E depict an additive manufacturing process by which a raised textured surface is built upon the pre-defined lattice structure 891. First a lattice structure 891 is formed in a computer assisted drawing application. As should be appreciated some embodiments of the lattice structure shown in FIG. 8A may include a plurality of nested three-dimensional lattice structures disposed in an overlaid pattern forming layers of three-dimensional lattices. The lattice structure is then turned into a mesh rendering 892 as depicted in FIG. 8B. The mesh render is then divided, preferably, into curve quadrants 893 as depicted in FIG. 8C. It should be appreciated that curve quadrants 893 have been found to be the more efficient for processing and design by the inventors, but quadrants are not strictly required for this process and more or fewer slices may be implemented. Once the mesh is sliced into curved portions, whether quadrants or other manner of slices, the curved portions 893 have additional volume 894 added to a desired depth of texture as depicted in FIG. 8D. This volume and depth setting step is important as it fine tunes the surface to create desired grippiness, texture, indents between the raised textured portions of the grip. After completing the surface texturing step, the surface texture information is exported and overlayed on the lattice surface information resulting in a final textured model 895 for additive manufacturing as depicted in FIG. 8E. Without this surface texturing process, the lattice structure would have a smooth facing surface which may result in reduced grippiness or texture further resulting in less airflow between the user's hands and the handlebar grip surface. Such lack of airflow may result in additional sweat build up between the user's hands and the handlebar grip surface potentially resulting in a loss of grip or slippage of the user's hands from the handlebar potentially causing unsafe riding conditions from reduced gripability and control.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Further, it should be appreciated that the disclosure and teachings of the several embodiments described herein may be used interchangeably to achieve different embodiments not explicitly depicted. Accordingly, it is intended that the following claims be interpreted to embrace all such variations and modifications.

What is claimed is the following:

1. The handlebar grip comprising:
a three-dimensional lattice structure comprising one or more layers of three-dimensional lattice; an internal sleeve having an exterior surface, wherein a three-dimensional ridge structure is disposed upon said exterior surface of the internal sleeve; wherein said three-dimensional lattice structure further comprises an interior surface that slidably engages with the exterior surface of said internal sleeve, wherein the three-dimensional lattice structure further comprises a keyway for engagement with said three-dimensional ridge structure disposed on said internal sleeve.

2. The handlebar grip of claim 1 further comprising a securing fastener disposed at a terminal end of said internal sleeve preventing the disengagement of the three-dimensional lattice structure from the internal sleeve.

3. The handlebar grip of claim 2 wherein the three-dimensional lattice structure comprises a plurality of nested layers of three-dimensional lattice structures.

4. The handlebar grip of claim 2 wherein the securing fastener is a securing ring.

5. The handlebar grip of claim 4 wherein the three-dimensional lattice structure comprises a plurality of nested layers of three-dimensional lattice structures.

6. The handlebar grip of claim 1 wherein the three-dimensional lattice structure comprises a plurality of nested layers of three-dimensional lattice structures.

* * * * *